United States Patent
Moscaritolo et al.

(10) Patent No.: US 8,489,889 B1
(45) Date of Patent: Jul. 16, 2013

(54) METHOD AND APPARATUS FOR RESTRICTING ACCESS TO ENCRYPTED DATA

(75) Inventors: Vincent E. Moscaritolo, Ashland, OR (US); Jonathan D. Callas, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 375 days.

(21) Appl. No.: 12/885,298

(22) Filed: Sep. 17, 2010

(51) Int. Cl.
*G06F 21/00* (2006.01)

(52) U.S. Cl.
USPC ............ 713/182; 379/93.02; 708/135; 726/6; 726/14; 726/27; 713/165

(58) Field of Classification Search
USPC ............... 379/93.02; 708/135; 713/150–182; 726/1–36
See application file for complete search history.

(56) References Cited

U.S. PATENT DOCUMENTS

| 2008/0016336 A1* | 1/2008 | Stirbu et al. ............... 713/156 |
| 2008/0034440 A1* | 2/2008 | Holtzman et al. ............. 726/27 |
| 2010/0138927 A1 | 6/2010 | Callas |

OTHER PUBLICATIONS

Seung Yi et al., "MOCA: MObile Certificate Authority for Wirless Ad Hoc Networks", Dec. 2004, Department of Computer Science University of Illinois at Urbana-Champaign, Report No. UIUCDCS-R-2004-2502 and UILU-ENG-2004-1805, pp. 1-9.*

* cited by examiner

*Primary Examiner* — Tonia L Dollinger
*Assistant Examiner* — Davoud Zand
(74) *Attorney, Agent, or Firm* — Lowenstein Sandler LLP (57) ABSTRACT

A computing device receives a command to restrict access to encrypted data. The computing device generates a new record that can access the encrypted data. The computing device encrypts the record information for the new record using a public key of a trusted entity. The computing device prevents access to the encrypted data for a previously generated record or records.

20 Claims, 5 Drawing Sheets

METHOD AND APPARATUS FOR RESTRICTING ACCESS TO ENCRYPTED DATA

RELATED APPLICATIONS

The present invention is related to co-pending U.S. patent application Ser. No. 12/326,751, entitled "Apparatus and Method for Preventing Unauthorized Access To Secure Information," which was filed on Dec. 2, 2008.

FIELD OF INVENTION

Embodiments of the invention relate to data protection, and more particularly to restricting access to encrypted data.

BACKGROUND OF THE INVENTION

To protect information, users often encrypt data using encryption software. Some enterprise encryption software provides users of personal computers within an organization with a means to enter a duress command, which locks out the encrypted data on the users' computers. Users may enter such a duress command by entering in a particular passphrase, by pressing a sequence of keys, etc. Users may enter a duress command when they believe that they will be coerced into providing their password to another individual (e.g., when they expect to cross a border) or during such coercion. Once the duress command is issued, an administrator needs to be contacted to re-enable the users' access to the encrypted data on their personal computers. However, individuals who have personal computers that are unmanaged by an organization's information services (IS) department or management console do not have the option of entering a duress command and later contacting an administrator to re-enable access to encrypted data.

SUMMARY OF THE INVENTION

In an exemplary method of one embodiment, a computing device receives a command to restrict access to encrypted data. In one embodiment, the encrypted data is encrypted with a primary key, and a first encrypted version of the primary key that has been encrypted with a secondary key associated with a previously generated record is stored in the computing device. The computing device generates a new record that can access the encrypted data. In one embodiment, generating the new record includes generating a new random secondary key, encrypting the primary key with the new random secondary key to generate a second encrypted version of the primary key, and storing the second encrypted version of the primary key in the computing device. The computing device encrypts record information for the new record using a public key of a trusted entity. The encrypted information for the new record may include the new random secondary key or a random string from which the new random secondary key can be derived (e.g., a random password or passphrase). In one embodiment, the computing device receives a designation of the trusted entity and determines the public key associated with that trusted entity. The computing device prevents access to the encrypted data for a previously generated record or records. In one embodiment, preventing access to the encrypted data for the previously generated record includes deleting the previously generated record, including deletion of the first encrypted version of the primary key. Preventing access to the encrypted data for the previously generated record may also include zeroing out locations that contained data associated with the previously generated record. In one embodiment, the computing device generates a message that includes the encrypted record information, and causes the encrypted message to be delivered to the trusted entity. The computing device may later receive the record information for the new record from the trusted entity after the trusted entity decrypts the encrypted record information using a private key. The computing device may then access the encrypted data using the record information for the new record.

In one embodiment, a computer readable medium includes instructions that can be executed to perform a method for restricting access to encrypted data. The encrypted data may be an encrypted virtual disk, an encrypted file, an encrypted folder, or an encrypted real disk. In one embodiment, the method is initiated by receiving a command to restrict access to encrypted data that has been encrypted with a primary key, wherein a first encrypted version of the primary key is stored in the computing device, the first encrypted version of the primary key having been encrypted with a secondary key. Upon receiving the command to restrict access to the encrypted data, an executing computing device generates a new random secondary key, encrypts the primary key with the new random secondary key to generate a second encrypted version of the primary key, and encrypts the new random secondary key or a random string from which the random secondary key can be derived using a public key of a trusted entity. In one embodiment, the computing device receives a designation of the trusted entity and determines the public key associated with that trusted entity. The computing device can additionally delete the first encrypted version of the primary key. In one embodiment, deleting the first encrypted version of the primary key includes zeroing out locations that contained data associated with the first encrypted version of the primary key. In one embodiment, the computing device causes the encrypted new random secondary key or random string to be delivered to the trusted entity. The computing device may then receive the random string from the trusted entity after the trusted entity decrypts the random string using a private key, derive the new random secondary key from the random string, and access the encrypted data using the new random secondary key.

In one embodiment, a computing device includes a storage device to store encrypted data that has been encrypted with a primary key. The storage device or an additional storage device also stores a first encrypted version of the primary key that has been encrypted with a secondary key. The computing device further includes a processing device to execute instructions for an access restricting subsystem upon receiving a command to restrict access to the encrypted data. The encrypted data may be an encrypted virtual disk, an encrypted file, an encrypted folder, or all contents of the storage device. The processing device generates a new random secondary key while executing the instructions for the access restricting subsystem. The processing device encrypts the primary key with the new random secondary key to generate a second encrypted version of the primary key. The processing device may store the second encrypted version of the primary key in at least one of the storage device or an additional storage device. The processing device encrypts the new random secondary key or a random string from which the random secondary key can be derived using a public key of a trusted entity. In one embodiment, the processing device receives a designation of the trusted entity and determines the public key associated with that trusted entity. The processing device deletes the first encrypted version of the primary key. Deleting the first encrypted version of the primary key may include zeroing out locations that contained data associated with the first encrypted version of the primary key. The processing device may cause the encrypted new random secondary key or encrypted random string to be delivered to the trusted entity. Subsequently, the processing device may receive the random string from the trusted entity after the trusted entity decrypts the random string using a private key, derive the new random secondary key from the random string, and access the encrypted data using the new random secondary key.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for restricting access to encrypted data are described. In one embodiment, the present invention operates on a personal computer that is not managed by an organization or management console. Users of such personal computers may occasionally be subjected to duress situations, in which they are coerced into providing access to their encrypted information to third parties. Some embodiments of the present invention provide such users of personal computers with a mechanism to disable their own access to their encrypted data. That way they cannot be forced to hand such access over to the coercing third parties.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "generating", "encrypting", "deleting", "delivering" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
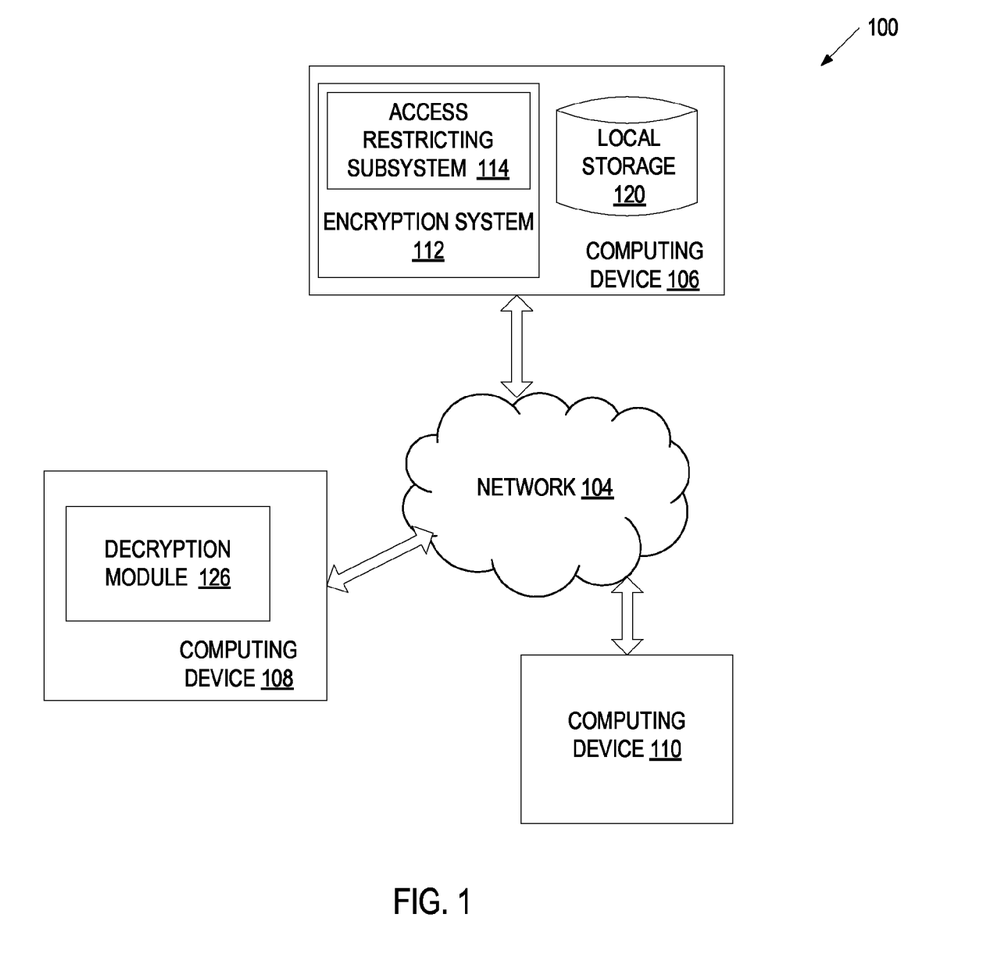
FIG. 1 illustrates an exemplary network architecture in which embodiments of the invention may operate.

FIG. 1 is a block diagram of an exemplary network architecture 100, in which embodiments of the present invention may operate. The architecture 100 includes multiple computing devices 106, 108, 110 connected via a network 104. The network 104 may be a private network (e.g., local area network (LAN), wide area network (WAN), metropolitan area network (MAN), etc.), a public network (such as the Internet), or a combination thereof. Note that though computing device 106 is shown as being connected to network 104, computing device 106 in some embodiments may not be connected to network 104. Embodiments of the present invention can function regardless of computing device's 106 network connectivity.

Each computing device 106, 108, 110 may be a desktop personal computer (PC), a laptop, a tablet computing device, a mobile phone, a server, or any other computing device. In one embodiment, computing device 106 is an individual's computing device, and is not managed by an organization's information technology (IT) department, information services (IS) department, or any management consoles or servers. Therefore, a user of the computing device 106 may not have access to a network administrator who can reset the user's passwords, or otherwise provide support.

Computing device 106 includes a local storage 120 and an encryption system 112. Encryption system 112 manages encryption for local storage 120, or for one or more files, folders, virtual drives (a disk image that is interpreted by an operating system as a physical disk drive), etc. stored within the local storage 120. The encryption system 112 may generate a primary key, and encrypt all or some data on the local storage 120 using the primary key. Alternatively, the encryption system 112 may encrypt just the contents of a single file, a folder, or a virtual disk drive contained in the local storage 120. The primary key may be a randomly generated key that is cryptographically strong. For example, the primary key may contain 128 random characters (e.g., random Base 32 characters). As new data is saved to the local storage 120 (or to the protected file, folder or virtual disk drive), the new data may be encrypted using the primary key.

The encryption system 112 may additionally generate one or more encryption records. Each encryption record contains an encrypted version of the primary key, and may include additional information. In one embodiment, the encryption records are user accounts. User accounts may be generated by creating an account identifier (e.g., an account number), and storing it with a checksum for a secondary key and/or an encrypted primary key.

Each record may have different secondary key. Some secondary keys are public key pairs. If an encryption record uses a user's public key pair as the secondary key, a public key of the user's public key pair is used to encrypt the primary key. The private key of the user's public key pair is then used to decrypt the primary key. Other secondary keys use symmetric encryption, and are based on a user provided string (e.g., a password or passphrase). In one embodiment, secondary keys are generated by deriving the secondary key from the user provided string. In one embodiment, the encryption system 112 operates on the user provided string using a password-based key derivation function such as string to key (STK), which is specified in IETF RFC-4880, "OpenPGP Message Format."

In one embodiment, the encryption system 112 generates a checksum of the secondary key and stores the checksum. In one embodiment, the checksum is generated by hashing the secondary key (processing the secondary key using a hashing function). The checksum may be used during decryption to verify that a correct user passphrase or password has been entered. For example, to read encrypted data, a user may enter a password, which may be input into a password-based key derivation function to derive the secondary password. The derived secondary key may then be hashed and then compared to the checksum. If the hashed secondary key matches the stored checksum, then it can be determined that the proper password was entered.

For each encryption record, the encryption system 112 encrypts the primary key with that account's secondary key. Therefore, the computing device 106 may contain multiple different encrypted versions of the primary key, each of which has been encrypted with a different secondary key, and each of which is associated with a different record. The encryption system 112 stores the encrypted versions of the primary key in the local storage 120 or in some other storage (e.g., an attached storage). The encrypted versions of the primary key may be stored along with the checksum and/or an account identifier (e.g., if the encryption record is a user account).

When a user attempts to access encrypted data stored in the local storage 120, the user may provide the secondary key associated with a particular record or enter a string (e.g., password or passphrase) from which the key can be derived. If public key encryption was used, the user may provide his private key. The secondary key may be processed by a hash function, and the hashed secondary key may be compared to the stored checksum to determine if they match. If the correct secondary key is provided (or derived from provided data), the encryption system 112 decrypts the primary key with the provided secondary key, and then decrypts the data in the local storage 120 (or virtual drive, file or folder) with the primary key.

Under certain circumstances, defined here as duress circumstances, a user may be pressured to provide his account password to another party. For example, it is not uncommon for border officials to require access to the contents of computing devices that are ported across international boundaries. The border officials may detain an individual until that individual provides passwords that were used to encrypt data stored in the local storage 120.

When a user predicts that he will be subject to a duress circumstance as described above, he may invoke access restricting subsystem 114, which in the illustrated embodiment is a component of encryption system 112. However, access restricting subsystem 114 may also be a separate module from encrypting module 112. Access restricting subsystem 114 may also be invoked during duress circumstances. The access restricting subsystem 114 may be invoked, for example, by entering a series of commands in a command-line interface (e.g., a computer's terminal window). For example, the access restricting subsystem may be invoked by typing the following commands in a command line interface:—vdrt <filename>—keyid<secondary key>. Alternatively, the access restricting subsystem 114 may be invoked via a graphical user interface (GUI), by pressing a particular sequence of keys on a keyboard of the computing device 106, or via other mechanisms. In one embodiment, the access restricting subsystem 114 is invoked via an interface that is ordinarily used to enter a user selected string (e.g., password or passphrase) for gaining access to the encrypted data. Alternatively, the access restricting subsystem 114 may be invoked by entering the user's standard password or passphrase with a particular prefix or suffix (e.g., a single character preceding or following the user's standard password or passphrase).

When the access restricting subsystem 114 is invoked, the access restricting subsystem 114 locks out (e.g., prevents) access to the encrypted data in the local storage 120. Therefore, the user of the computing device 106 is no longer able to access the encrypted data. Even if the user were to then provide his or her password to someone who was coercing the user to do so, the password would still not be able to provide access to the encrypted data. When the access restricting subsystem 114 prevents access to the encrypted data, the access restricting subsystem 114 also generates a new encryption record, and a new random secondary key for the new record. This new random secondary key is used to encrypt the primary key. Once access to the encrypted data is restricted, only the new random secondary key may be able to access the encrypted data. However, this random secondary key is not known to the user. Instead, the new random secondary key and/or a random string from which the new random secondary key is derivable is encrypted using the public key of a trusted entity that may have been designated by the user or selected automatically by the access restricting subsystem 114. Only the holder of the private key that is the counterpart to the public key used to encrypt the new random secondary key can decrypt the random secondary key. Therefore, only the trusted entity can grant access to the encrypted data. This trusted entity may be, for example, a trustee, attorney, best friend, etc. of the user. Alternatively, the trusted entity may be, for example, a company that provides or sells the encryption system 112.

The encrypted random secondary key and/or random string may be in the form of an encrypted message or packet. This message may be stored on the local storage 120, and later provided to the trusted entity. Alternatively, the encrypted message may be posted to computing device 110, which may be a server computing device. For example, computing device 110 may be a server for an online social networking website, a server for a blog, or some other online server that information can be posted to. In one embodiment, the computing device 106 includes information identifying one or more locations associated with the trusted entity to which the encrypted message can be posted. For example, computing device 106 may include an identification of a social networking website account associated with the trusted entity, of a blog associated with the trusted entity, etc. Access restricting subsystem 114 may use this information to post the encrypted message.

The encrypted message may also be sent to computing device 108, which may be a computing device of the trusted entity. The message may be sent to the computing device 108 via email, file transfer protocol (FTP), telnet, or some other data transfer protocol. In one embodiment, computing device 106 stores information identifying an email address, FTP server, telnet server, etc. associated with the trusted entity. Access restricting subsystem may use this information to send the message to the computing device 108. Alternatively, the computing device 108 may retrieve the message from computing device 110 if the encrypted message was posted to an online location. How computing device is notified as to the posting of the encrypted message is dependent on the location to which it was posted. For example, if the message was posted to a social networking website, that website may be configured to send email notifications to the trusted entity whenever new messages are posted for him or her.

Computing device 108 includes a decryption module 126. Decryption module 126 includes the trusted entity's private key. Accordingly, decryption module 126 decrypts the message and the new random secondary key and/or random string included in the message using the trusted entity's private key. The trusted entity can then provide the random secondary key and/or random string to the user of computing device 106 at any time to enable the user to regain access to the encrypted data on local storage 120. In one embodiment, the trusted entity encrypts the random secondary key and/or random string using a public key of the user. The user may then use his private key to decrypt the random secondary key and/or random string, while anyone intercepting the encrypted random secondary key and/or random string would be unable to use it.

Figure 2:
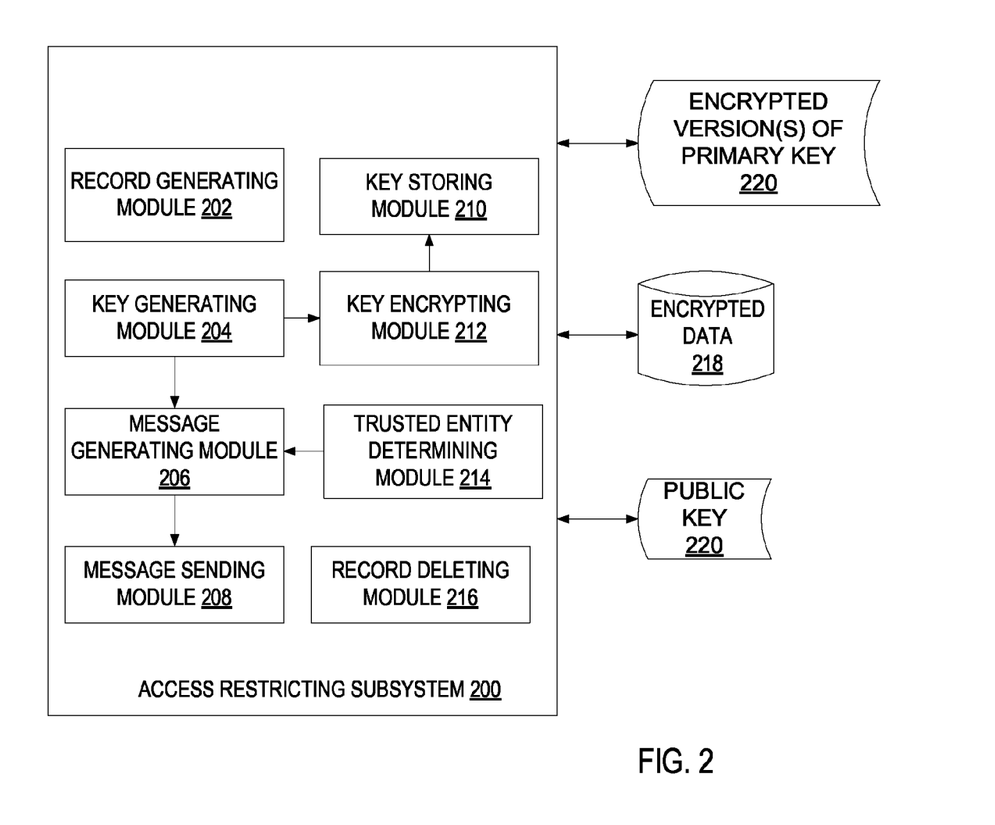
FIG. 2 is a block diagram of one embodiment of an access restricting subsystem.

FIG. 2 is a block diagram of one embodiment of an access restricting subsystem 200. The access restricting subsystem 200 may be a component of an encryption system, such as encryption system 112 of FIG. 1. The access restricting subsystem 200 in one embedment includes a record generating module 202, a key generating module 204, a key encrypting module 212, a key storing module 210, a message generating module 206, a trusted entity determining module 214, a message sending module 208 and a record deleting module 216. Alternatively, the access restricting subsystem 200 may include a subset of these components. It should be noted that the individual modules included in access restricting subsystem 200 are merely examples of modules for one embodiment of the present invention. The functions of these modules may be combined. Additionally, the functions of one or more of these modules may not be performed in some embodiments of the present invention. Moreover, access restricting subsystem 200 may include more modules than shown (e.g., the functions of one or more of the modules may be divided into multiple modules).

Access restricting subsystem 200 is connected with or has access to encrypted data 218. In one embodiment, encrypted data 218 is encrypted using a layered encryption scheme. For example, the encrypted data may be encrypted using a primary key. There may be multiple encryption records that have access to the encrypted data 218. Each of the records has a secondary key that has been used to encrypt the primary key to generate a distinct encrypted version of the primary key 224. When a user attempts to access the encrypted data 218, the user provides the secondary key associated with a particular record, or enters a password or passphrase from which the secondary key is derivable. If a password or passphrase is entered, the encryption system performs a string to key operation that recreates the secondary key from the password or passphrase. The secondary key is used to decrypt the encrypted version of the primary key 224 that has been encrypted with the secondary key. The primary key is then used to decrypt the encrypted data 218. Note that the primary key may not be user accessible, and may be unknown to the users.

Record generating module 202 generates a new record upon execution of access restricting subsystem 200. The new record may be a new account that is assigned a specified account name or a random account name. The new record may be stored to disk along with associated record information, which is described below. In one embodiment, the new record is provides administrative privileges. Therefore, users who access encrypted data 218 using the new record have administrative privileges, such as the ability to generate other records (e.g., including generating a new secondary key based on a user selected passphrase and encrypting the primary key with the new secondary key).

Key generating module 204 generates a new random secondary key for the new account. Note that the new random secondary key may be truly random, or may be pseudorandom (e.g., a sequence of characters that approximates random values). In one embodiment, the new random secondary key is generated by first generating a random string of characters (e.g., 128 Base 32 characters). The random string is then processed using a string to key (STK) function that generates the new secondary key from the random string. Generating the new random secondary key may also include generating a checksum for the secondary key (e.g., by hashing the new secondary key using a cryptographic hash function such as message digest 5 (MD5), Secure Hash Algorithm 2 (SHA-2), etc.) and storing the checksum. The hash function is a deterministic process that takes as an input an arbitrary block of data and outputs a fixed size bit string. The checksum may be stored along with other record information.

Once the new random secondary key is generated, key encrypting module 212 encrypts the primary key using the new random secondary key to generate a new encrypted version of the primary key. Key storing module 210 stores the new encrypted version of the primary key. The new encrypted version of the primary key may be stored along with the checksum.

Trusted entity determining module 214 determines a trusted entity to which to entrust the ability to access the encrypted data 218. A user may have previously selected the trusted entity, or may be prompted to select the trusted entity by the trusted entity determining module 214 (e.g., if the user is not presently under duress). Alternatively, a default trusted entity may be used. The default trusted entity may be, for example, a corporation that sells the access restricting subsystem 200.

It is assumed that the trusted entity has a certificate that is associated with a public key pair. The public key pair includes a private key and a public key. Data encrypted with the public key can only be decrypted using the corresponding private key. Similarly, data encrypted with the private key can only be decrypted with the corresponding public key. The public key is made public, so that anyone can encrypt data with the public key. The private key is only known by the entity associated with the certificate. Therefore, data that is encrypted with the public key can only be decrypted by the entity holding the private key.

Once the trusted entity is determined, the trusted entity determining module 214 attempts to locate that trusted entity's public key 220. The trusted entity's public key 220 may have previously been obtained, and may thus be stored in a known location. Additionally, if the access restricting subsystem 200 has network access, it may retrieve the public key 220 of the trusted entity from a certificate authority, online certificate status protocol (OCSP) responder, or other server. Upon obtaining or locating the trusted entity's public key 220, trusted entity determining module 214 may query a server such as an OCSP responder as to whether a certificate associated with the trusted entity's public key has been revoked. A different trusted entity may then be selected if the originally chosen trusted entity's certificate has been revoked (indicating that the trusted entity's private key has been compromised).

Message generating module 206 encrypts the new random secondary key or a random string from which the new secondary key is derivable using the trusted entity's public key. In one embodiment, message generating module 206 generates a message or packet that includes the new random string, and encrypts the message using the trusted entity's public key. In another embodiment, the message generating module 206 generates a message or packet that includes the new random secondary key, and encrypts the message using the trusted entity's public key. Alternatively, the message may include both the random secondary key and the random string. In one embodiment, message generating module 206 uses an OpenPGP protocol to generate a pretty good privacy (PGP) message.

Message sending module 208 may store the encrypted message or packet. Message sending module 208 may also send the encrypted message/packet to the trusted entity (e.g., using email), or may post the encrypted message to a location that can be accessed by the trusted entity (e.g., to the trusted entity's account on a social networking website, to a blog managed by the trusted entity, etc.).

In one embodiment, record deleting module 216 deletes all records other than the newly generated record. The records may be deleted from local memory and/or non-volatile storage locations of the computing device. This may include deleting the encrypted versions of the primary key associated with the deleted records. In one embodiment, record deleting module 216 obtains a list of all records that can access the encrypted data 218, and deletes all such records. Alternatively, record deleting module 216 may delete fewer than all records that have access to the encrypted data 218 (e.g., may delete only a selected record). After a record is deleted, there should be no remnants of information that identify the deleted record. Once the records are deleted, the only way to access the encrypted data 218 may be by using the new random secondary key that is included in the encrypted message or that can be derived from the random string that is included in the encrypted message. Therefore, since the message is encrypted with the trusted entity's public key, only the trusted entity has the information necessary to access the encrypted data.

In the preceding description, the access restricting subsystem has been described as being a component of a personal computing device. However, in one embodiment, the access restricting module, or at least a portion of the access restricting module, is implemented as part of a cloud computing environment. For example, the message sending module 208 may be separate from the rest of the access restricting subsystem 200, and may be included in a cloud computing environment.

Figure 3:
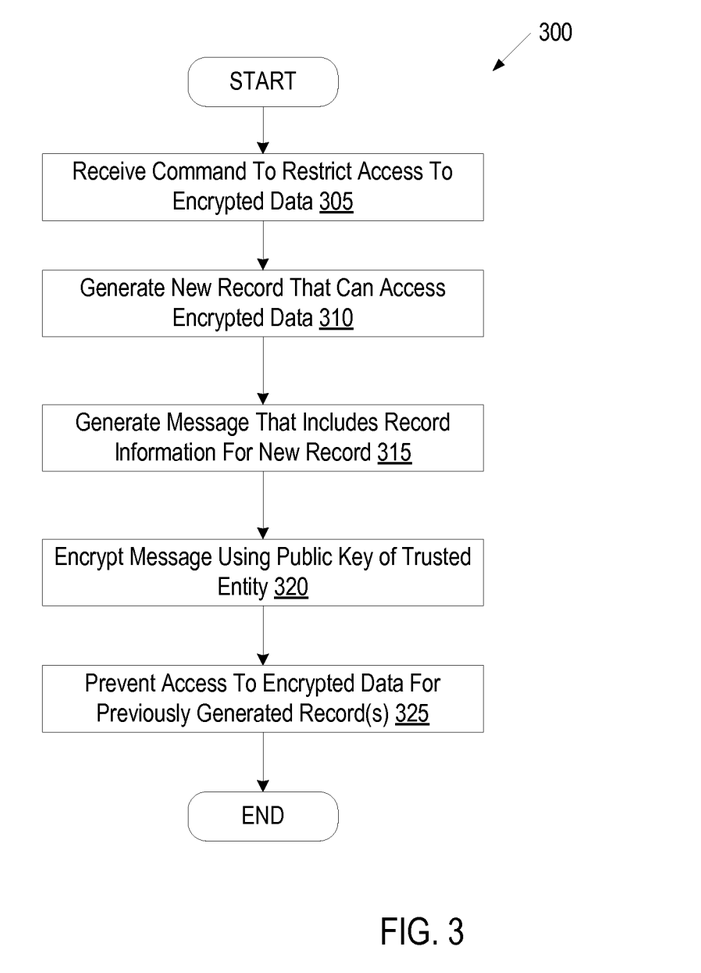
FIG. 3 is a flow diagram of one embodiment of a method for restricting access to encrypted data.

FIG. 3 is a flow diagram of one embodiment of a method 300 for restricting access to encrypted data. The method 300 is performed by processing logic that may comprise hardware (circuitry, dedicated logic, etc.), software (such as is run on a general purpose computer system or a dedicated machine), or a combination of both. The method 300 may be performed by an encryption system and/or an access restricting subsystem of a computing device (e.g., encryption system 112 of FIG. 1 or access restricting subsystem 200 of FIG. 2).

Referring to FIG. 3, at block 305 of method 300 processing logic receives a command to restrict access to encrypted data. The command may be received via a GUI or command line interface. At block 310, processing logic generates a new record that provides access to the encrypted data. Generating the new record may include automatically generating new record information without user input. This may include generating a random string, generating a new random secondary key (e.g., from the random string), generating a checksum for the new random secondary key and storing the checksum, generating a new encrypted version of the primary key using the new random secondary key and storing it, and so on.

At block 315, processing logic generates a message that includes record information for the new record. The record information included in the message may be the new random secondary key and/or the random string from which the random secondary key can be derived. At block 320, processing logic encrypts the message using a public key of a trusted entity. At block 325, processing logic prevents access to encrypted data for some or all previously generated records. This may include deleting all previously generated records. Therefore, only the new record may have access to the encrypted data.

Figure 4:
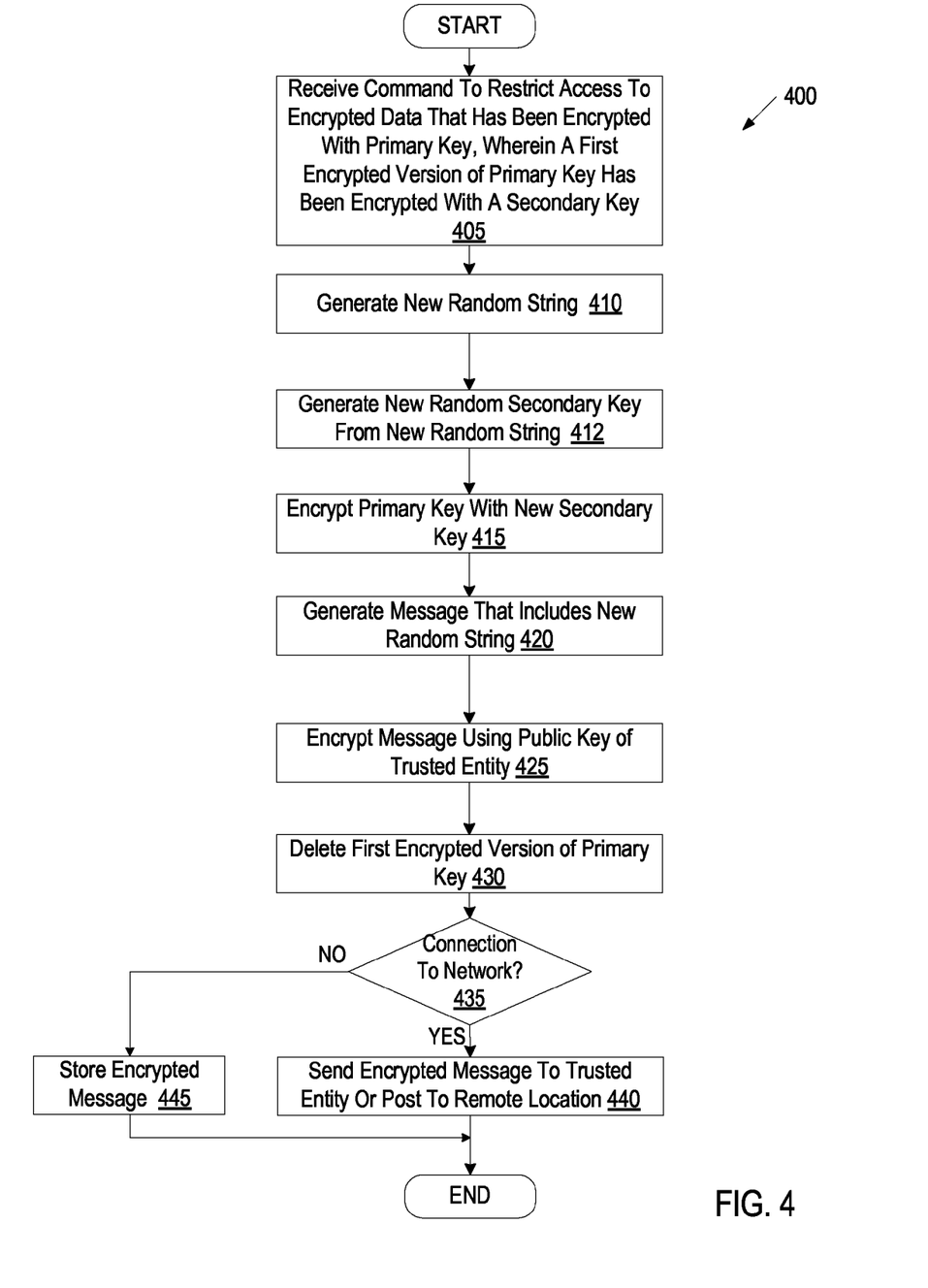
FIG. 4 is a flow diagram of another embodiment of a method for restricting access to encrypted data.

FIG. 4 is a flow diagram of another embodiment of a method 400 for restricting access to encrypted data. The method 400 is performed by processing logic that may comprise hardware (circuitry, dedicated logic, etc.), software (such as is run on a general purpose computer system or a dedicated machine), or a combination of both. The method 400 may be performed by an encryption system and/or an access restricting subsystem of a computing device (e.g., encryption system 112 of FIG. 1 or access restricting subsystem 200 of FIG. 2).

Referring to FIG. 4, at block 405 of method 400 processing logic receives a command to restrict access to encrypted data. The encrypted data may have been encrypted with a primary key. Additionally, the primary key may have itself been encrypted with a secondary key associated with a user account to generate a first encrypted version of the primary key. Therefore, the first encrypted version of the primary key can be decrypted using the secondary key to reveal the cleartext version of the primary key.

At block 410, processing logic generates a random string (e.g., a 32 bit random string, 64 bit random string, 128 bit random string, etc.) associated with the new record. At block 412, processing logic generates a new random secondary key from the random string associated with the account. This may be performed by processing the random string using a string to key (STK) function. Note that in an alternative embodiment, processing logic may generate the new random secondary key directly, without first generating a random string. At block 415, processing logic then encrypts the primary key with the new secondary key to generate a second encrypted version of the primary key. The second encrypted version of the primary key can be decrypted to reveal a cleartext version of the primary key.

At block 420, processing logic generates a message that includes the random string. Alternatively, processing logic may generate a message that includes the random secondary key, or a combination of the random secondary key and the random string. At block 425, processing logic encrypts the message using a public key of a trusted entity. At block 430, processing logic deletes the first encrypted version of the primary key. That way, the secondary key can no longer be used to access the encrypted data. The processing logic may also delete all evidence that the record associated with the first encrypted version of the primary key ever existed. This may include identifying memory and/or disk locations where information associated with the deleted record resided, and zeroing out all data bits that previously held such information (resetting each bit so that it contains a 0 value). This precludes the possibility of someone reconstructing the deleted information.

At block 435, processing logic determines whether there is a connection to a network. If a connection to a network is detected, at block 440 processing logic sends the encrypted message to the trusted entity, or posts the encrypted message to a location from which the trusted entity can retrieve it. If no network connection is connected, the method continues to block 445, and processing logic stores the encrypted message. The message can later be sent to the trusted entity when a network connection is enabled. Note that the message can also be stored even if there is an available network connection.

Figure 5:
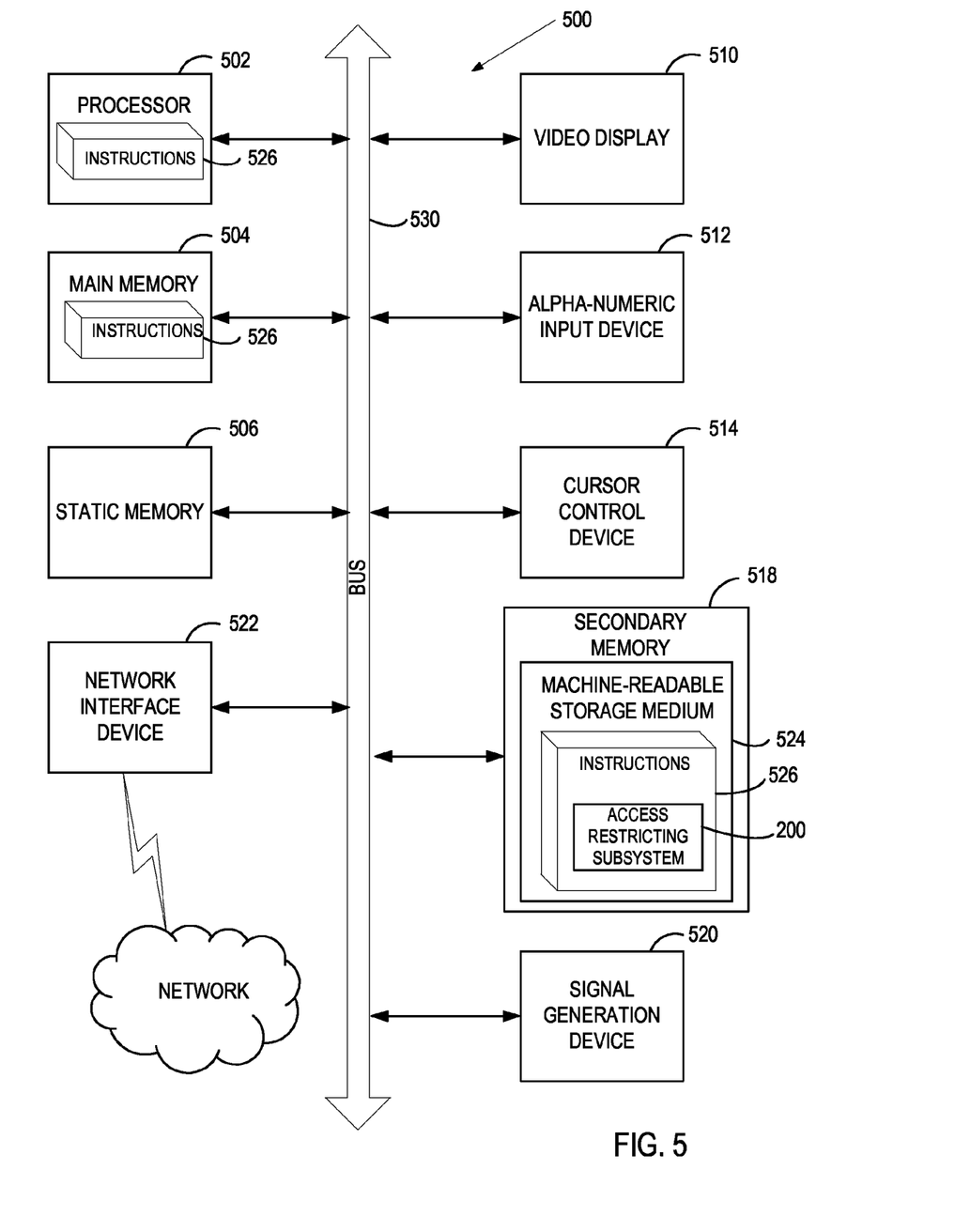
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute instructions 526 (e.g., processing logic) for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 518 may include a machine-readable storage medium (or more specifically a computer-readable storage medium) 524 on which is stored one or more sets of instructions 526 (e.g., software) embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

The machine-readable storage medium 524 may also be used to store the encryption system 112 of FIG. 1 and/or access restricting subsystem 200 of FIG. 2, and/or a software library containing methods that call the encryption system and/or access restriction module. While the machine-readable storage medium 524 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:
1. A computer-implemented method comprising:
receiving a command to restrict access to encrypted data that has been encrypted with a primary key, wherein a first encrypted version of the primary key is stored in a computing device, and wherein the first encrypted version of the primary key has been encrypted with a secondary key;
generating a new random secondary key;

encrypting the primary key with the new random secondary key to generate a second encrypted version of the primary key;

encrypting at least one of the new random secondary key or a random string from which the new random secondary key is derivable using a public key of a trusted entity; and deleting the first encrypted version of the primary key from the computing device.

2. The method of claim 1, further comprising: storing the second encrypted version of the primary key in the computing device.

3. The method of claim 2, wherein deleting the first encrypted version of the primary key comprises zeroing out locations that contained data associated with the first encrypted version of the primary key.

4. The method of claim 1, further comprising:
receiving a designation of the trusted entity; and
determining the public key associated with the trusted entity.

5. The method of claim 1, wherein the encrypted data is one of an encrypted virtual disk, an encrypted file, an encrypted folder, or an encrypted real disk.

6. The method of claim 1, further comprising:
causing at least one of the encrypted new random secondary key or the encrypted random string to be delivered to the trusted entity.

7. The method of claim 6, further comprising:
receiving the random string from the trusted entity after the trusted entity decrypts the random string using a private key;
deriving the new random secondary key from the random string; and
accessing the encrypted data using the new random secondary key.

8. A non-transitory computer readable medium including instructions that, when executed by a computing device, cause the computing device to perform a method comprising:
receiving a command to restrict access to encrypted data that has been encrypted with a primary key, wherein a first encrypted version of the primary key is stored in the computing device, and wherein the first encrypted version of the primary key has been encrypted with a secondary key;
generating a new random secondary key;
encrypting the primary key with the new random secondary key to generate a second encrypted version of the primary key;
encrypting at least one of the new random secondary key or a random string from which the new random secondary key is derivable using a public key of a trusted entity; and
deleting the first encrypted version of the primary key from the computing device.

9. The non-transitory computer readable medium of claim 8, wherein deleting the first encrypted version of the primary key comprises zeroing out locations that contained data associated with the first encrypted version of the primary key.

10. The non-transitory computer readable medium of claim 8, the method further comprising: receiving a designation of the trusted entity; and determining the public key associated with the trusted entity.

11. The non-transitory computer readable medium of claim 8, wherein the encrypted data is one of an encrypted virtual disk, an encrypted file, an encrypted folder, or an encrypted real disk.

12. The non-transitory computer readable medium of claim 8, the method further comprising: causing at least one of the encrypted new random secondary key or the encrypted random string to be delivered to the trusted entity.

13. The non-transitory computer readable medium of claim 12, the method further comprising: receiving the random string from the trusted entity after the trusted entity decrypts the random string using a private key; deriving the new random secondary key from the random string; and accessing the encrypted data using the new random secondary key.

14. A computing device comprising:
a storage device to store encrypted data that has been encrypted with a primary key, at least one of the storage device or an additional storage device to store a first encrypted version of the primary key that has been encrypted with a secondary key; and
a processing device to execute instructions for an access restricting subsystem upon receiving a command to restrict access to the encrypted data, wherein the instructions cause the processing device to:
generate a new random secondary key;
encrypt the primary key with the new random secondary key to generate a second encrypted version of the primary key;
encrypt at least one of the new random secondary key or a random string from which the new random secondary key is derivable using a public key of a trusted entity; and
delete the first encrypted version of the primary key from at least one of the storage device or the additional storage device.

15. The computing device of claim 14, wherein deleting the first encrypted version of the primary key comprises zeroing out locations that contained data associated with the first encrypted version of the primary key.

16. The computing device of claim 14, further comprising the instructions to cause the processing device to:
receive a designation of the trusted entity; and
determine the public key associated with the trusted entity.

17. The computing device of claim 14, wherein the encrypted data is one of an encrypted virtual disk, an encrypted file, an encrypted folder, or all contents of the storage device.

18. The computing device of claim 14, further comprising the instructions to cause the processing device to:
cause at least one of the encrypted new random secondary key or the encrypted random string to be delivered to the trusted entity.

19. The computing device of claim 18, further comprising the instructions to cause the processing device to:
receive the random string from the trusted entity after the trusted entity decrypts the random string using a private key;
derive the new random secondary key from the random string; and
access the encrypted data using the new random secondary key.

20. The computing device of claim 14, further comprising the instructions to cause the processing device to:
store the second encrypted version of the primary key in at least one of the storage device or the additional storage device.

* * * * *